United States Patent
Harper et al.

(10) Patent No.: US 9,854,066 B1
(45) Date of Patent: *Dec. 26, 2017

(54) SYSTEM, METHOD, AND COMPUTER PROGRAM FOR CUSTOMIZING A RESPONSE TO A REQUEST

(71) Applicant: Amdocs Software Systems Limited, Dublin (IE)

(72) Inventors: Andrew Harper, Roswell, GA (US); Ilya A. Harahap, San Jose, CA (US); William W. Kable, Chicago, IL (US); Ted T. Nguyen, San Jose, CA (US)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 184 days.

This patent is subject to a terminal disclaimer.

(21) Appl. No.: 13/759,954

(22) Filed: Feb. 5, 2013

(51) Int. Cl.
  *H04L 29/08* (2006.01)
  *H04L 29/06* (2006.01)
  *G06F 9/44* (2006.01)

(52) U.S. Cl.
  CPC ............ *H04L 67/42* (2013.01); *G06F 9/4446* (2013.01); *H04L 67/02* (2013.01); *H04L 67/34* (2013.01)

(58) Field of Classification Search
  CPC ............... H04L 29/08072; H04L 29/06; H04L 29/0809; H04L 29/08117; H04L 2029/06054; H04L 65/4084; H04L 67/1002; H04L 67/42; G06Q 30/02; G06F 17/30067; G06F 17/30203; H04N 21/21; H04N 21/214; H04N 21/222; H04N 21/2221; H04N 21/2223; H04N 21/2225

USPC ......................................................... 709/219
See application file for complete search history.

(56) References Cited

U.S. PATENT DOCUMENTS

| | | | |
|---|---|---|---|
| 6,571,282 B1* | 5/2003 | Bowman-Amuah | G06F 17/30893 707/999.01 |
| 6,925,481 B2* | 8/2005 | Singhal et al. | ............... 709/200 |
| 7,228,421 B1* | 6/2007 | Huang et al. | .................. 713/171 |
| 2002/0010705 A1* | 1/2002 | Park et al. | .................. 707/104.1 |
| 2003/0217166 A1* | 11/2003 | Dal Canto | .......... H04L 63/0272 709/229 |
| 2005/0120180 A1 | 6/2005 | Schornbach et al. | |
| 2006/0217113 A1* | 9/2006 | Rao et al. | .................. 455/422.1 |
| 2007/0067385 A1 | 3/2007 | D'Angelo et al. | |
| 2007/0198691 A1 | 8/2007 | Koch | |
| 2008/0183678 A1* | 7/2008 | Weston | ............. G06F 17/30699 |
| 2009/0119150 A1* | 5/2009 | Stephanou | ............. G06Q 10/06 705/7.37 |

(Continued)

OTHER PUBLICATIONS

"Device Fingerprint," Wikipedia, Feb. 2, 2013, retrieved from http://en.wikipedia.org/wiki/Device_fingerprint.

(Continued)

*Primary Examiner* — Dhairya A Patel
*Assistant Examiner* — Clifton Houston
(74) *Attorney, Agent, or Firm* — Zilka-Kotab, PC (57) ABSTRACT

A system, method, and computer program product are provided for customizing a response to a request. In use, a request is received. Additionally, one or more elements associated with the request are determined. Further, a response to the request is customized, utilizing the determined one or more elements associated with the request. Further still, the response to the request is initiated.

3 Claims, 4 Drawing Sheets

(56) References Cited

U.S. PATENT DOCUMENTS

| | | | |
|---|---|---|---|
| 2009/0199255 A1* | 8/2009 | Yasrebi | H04N 7/16 |
| | | | 725/118 |
| 2009/0254481 A1 | 10/2009 | Lee et al. | |
| 2010/0030875 A1* | 2/2010 | Visser | H04L 41/0806 |
| | | | 709/220 |
| 2010/0081460 A1* | 4/2010 | Knight | H04L 12/6418 |
| | | | 455/461 |
| 2010/0093319 A1* | 4/2010 | Sherman | H04M 3/42178 |
| | | | 455/414.1 |
| 2010/0161718 A1 | 6/2010 | Soelberg et al. | |
| 2011/0170673 A1* | 7/2011 | Dutta | G06Q 10/10 |
| | | | 379/88.04 |
| 2012/0077496 A1 | 3/2012 | Mathias et al. | |
| 2012/0089610 A1 | 4/2012 | Agrawal et al. | |
| 2012/0101952 A1 | 4/2012 | Raleigh et al. | |
| 2012/0117183 A1* | 5/2012 | Wong et al. | 709/217 |
| 2012/0117189 A1* | 5/2012 | Lam et al. | 709/217 |
| 2012/0158514 A1* | 6/2012 | Aldrey | G06Q 30/0269 |
| | | | 705/14.66 |
| 2012/0290660 A1* | 11/2012 | Rao et al. | 709/204 |
| 2012/0291104 A1* | 11/2012 | Hasek | 726/4 |
| 2013/0059578 A1* | 3/2013 | Finberg | 455/425 |
| 2013/0103973 A1* | 4/2013 | Werth | G06F 9/4446 |
| | | | 714/2 |
| 2013/0191249 A1* | 7/2013 | Schwartz | G06Q 30/02 |
| | | | 705/26.61 |
| 2014/0157363 A1 | 6/2014 | Banerjee | |
| 2014/0250465 A1* | 9/2014 | Mulholland | G06Q 30/0241 |
| | | | 725/60 |

OTHER PUBLICATIONS

Steele, J., "Dusting for device fingerprints," Mar. 1, 2011, retrieved from http://strata.oreilly.com/2011/03/device-identification-bluecava.html.

Nokia Developer Wiki, "Device and feature detection on the mobile web," Jun. 29, 2012, retrieved from http://www.developer.nokia.com/Community/Wiki/Device_and_feature_detection_on_the_mobile_web.

Non-Final Office Action from U.S. Appl. No. 13/759,951, dated Nov. 28, 2014.

Harper et al., U.S. Appl. No. 13/759,951, filed Feb. 5, 2013.

Final Office Action from U.S. Appl. No. 13/759,951, dated Apr. 30, 2015.

Advisory Action from U.S. Appl. No. 13/759,951, dated Jul. 10, 2015.

Non-Final Office Action from U.S. Appl. No. 13/759,951, dated Sep. 4, 2015.

Final Office Action from U.S. Appl. No. 13/759,951, dated Feb. 26, 2016.

* cited by examiner

SYSTEM, METHOD, AND COMPUTER PROGRAM FOR CUSTOMIZING A RESPONSE TO A REQUEST

FIELD OF THE INVENTION

The present invention relates to servicing requests, and more particularly to customizing responses to requests.

BACKGROUND

Correctly and addressing a user's needs is a critical component of the provision of user-based services. For example, accurately troubleshooting user problems is an important part of provisioning customer service to a user. Unfortunately, conventional methods for servicing user requests have exhibited various limitations.

For example, current technology may respond to user requests in a limited manner that may not be directly tailored to the requesting user. There is thus a need for addressing these and/or other issues associated with the prior art.

SUMMARY

A system, method, and computer program product are provided for customizing a response to a request. In use, a request is received. Additionally, one or more elements associated with the request are determined. Further, a response to the request is customized, utilizing the determined one or more elements associated with the request. Further still, the response to the request is initiated.

DETAILED DESCRIPTION

Figure 1:
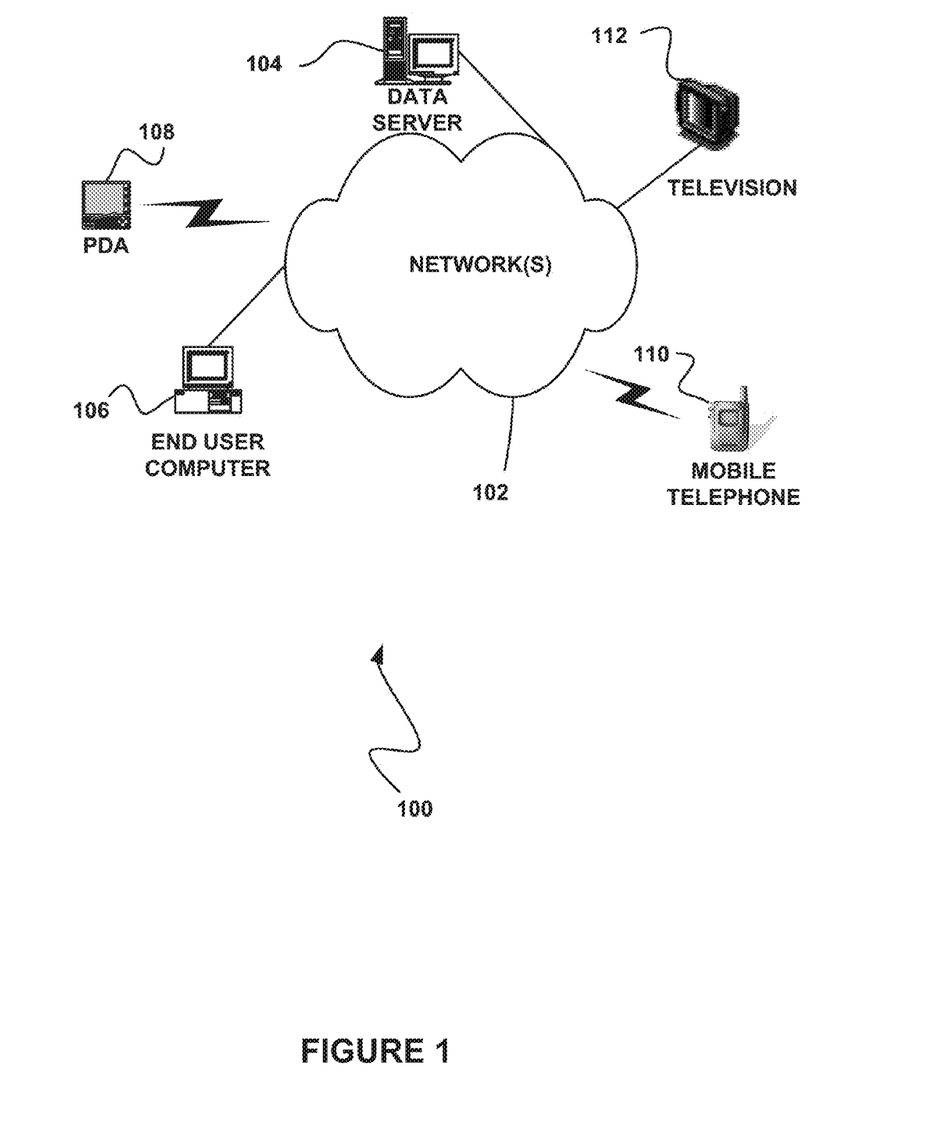
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
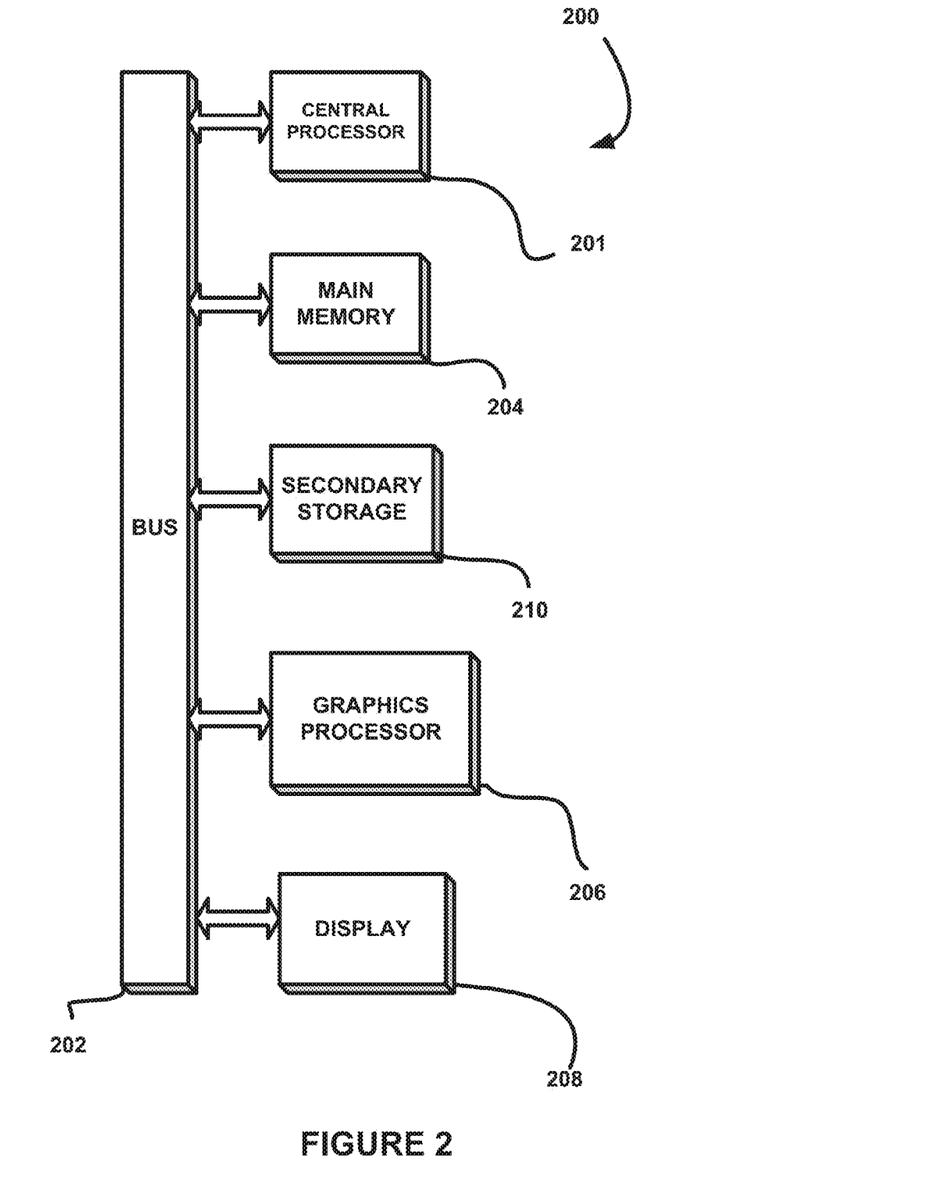
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
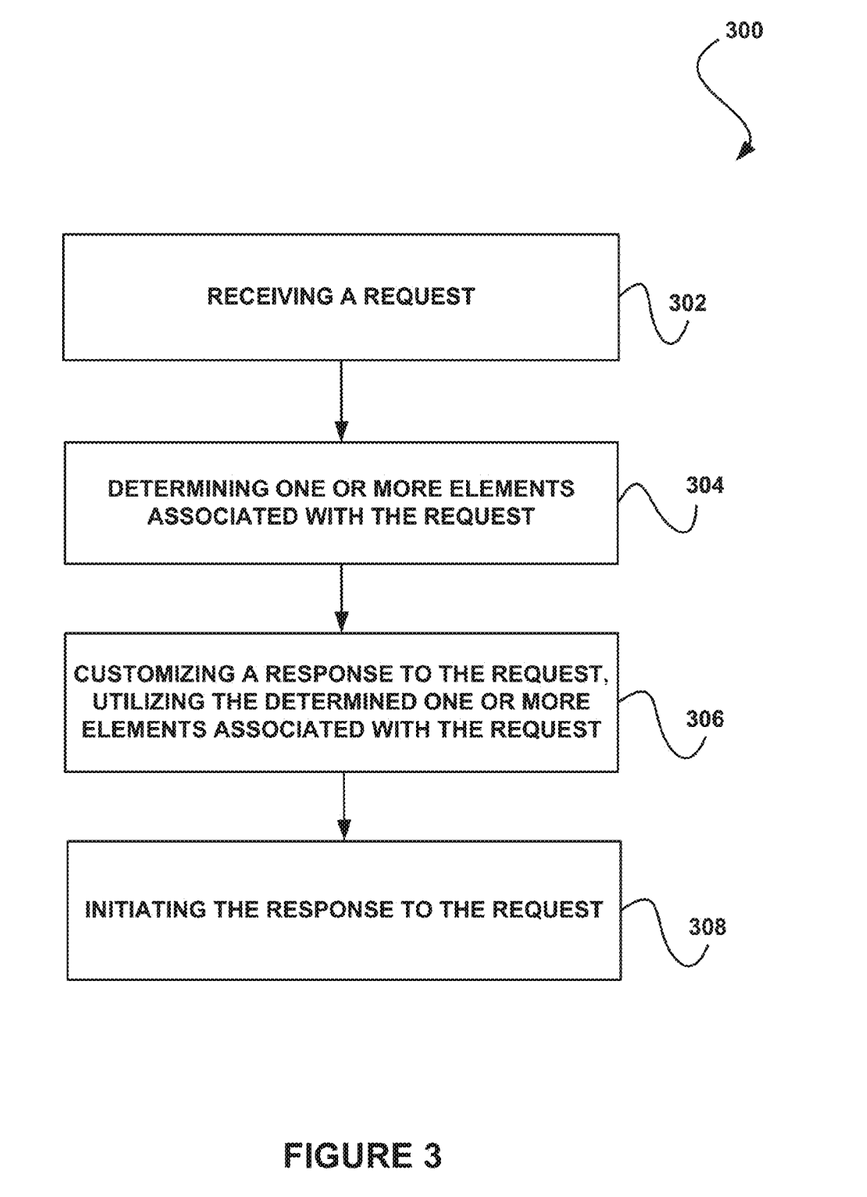
FIG. 3 illustrates a method for customizing a response to a request, in accordance with one embodiment.

FIG. 3 illustrates a method 300 for customizing a response to a request, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a request is received. In one embodiment, the request may be sent by a user utilizing a device. For example, the user may send the request utilizing a telephone, a mobile device, a desktop computer, a tablet computer, a public kiosk, an interactive/smart television, etc. In another embodiment, the request may be received by a server. For example, the request may include a network communication that is received by the server.

Additionally, in one embodiment, the request may include a request for a service. For example, the request may include a customer support request, a diagnostic request, a troubleshooting request, a reservation request, an automation request, etc. In another embodiment, the request may include a purchase request. For example, the request may include a request to purchase a good or service. In yet another embodiment, the request may include a request associated with a device. For example, the request may be associated with a device used to send the request, a device other than the device used to initiate the request, etc. In still another embodiment, the request may include a request associated with an action to be performed in association with the device. For example, the request may include a request to assist with performing a particular action (e.g., take a picture, deposit a check, make a phone call, etc.) utilizing the device.

Further, in one embodiment, the request may be received in the form of a question. In another embodiment, the request may be received in a natural language format. For example, the request may be received as a complete sentence. In another embodiment, the request may be spoken by a user. For example, the request may be spoken by the user, utilizing an interactive voice service interface (e.g., an interactive voice response (IVR) system, etc.). In yet another embodiment, the spoken request may be converted to text. For example, the spoken request may be converted to text utilizing speech-to-text software.

Further still, as shown in operation 304, one or more elements associated with the request are determined. In one embodiment, determining the one or more elements associated with the request may include determining an identification of the user that sent the request. For example, an identity (e.g., a name, a user name, a title, etc.) of the user that sent the request may be obtained (e.g., by analyzing the request to determine a user identifier associated with the request, tracing the request to a source of the request to determine a user identifier associated with the request, etc.).

Additionally, in one embodiment, determining the one or more elements associated with the request may include determining one or more means by which the request was sent. For example, determining the one or more elements associated with the request may include determining the device used by the user to send the request. In yet another embodiment, determining the one or more elements associated with the request may include determining a device identifier associated with the user who sent the request. In yet another embodiment, the device used by the user to send the request may be determined by analyzing the request.

For example, the request may include an indication of a model of the device that sent the request, a name of the device that sent the request, one or more characteristics of the device that sent the request, etc. In still another embodiment, the one or more elements may be determined by accessing a data service. For example, a data service may contain information including user information and device information associated with the user, including model numbers and characteristics of all devices associated with the user. In another example, the user that sent the request may be identified, and the data service may be accessed to determine the device that was used by the user to send the request.

In yet another embodiment, the one or more elements may be determined by accessing a database or a business support system/operational support system (BSS/OSS) associated with the user. For example, the BSS/OSS may contain information including customer operational service data, customer profile information and demographics, a customer's purchased products and services, customer offer eligibility, billing history and behavior, usage data, interaction history, customer problems, etc.

Also, in one embodiment, determining the one or more elements associated with the request may include determining a communication channel used by the user to send the request. For example, the communication channel may include a computer network, a cellular network, a satellite network, a telephonic network, or any other network used by the user to send the request. In another embodiment, the communication channel may be determined by analyzing the request. For example, one or more parameters of the request that identify the communication channel used to make the request may be determined.

In addition, in one embodiment, determining the one or more elements associated with the request may include determining a bandwidth available to the user who sent the request (e.g., a currently available bandwidth, etc.). In another embodiment, the bandwidth available to the user may be determined by analyzing the request, communicating with a service provider who sent the request, accessing a database and/or BSS/OSS that associates bandwidth information with user identifiers, etc. In yet another embodiment, the user may be associated with a plurality of devices, and the means may include one of the plurality of devices.

Furthermore, as shown in operation 306, a response to the request is customized, utilizing the determined one or more elements associated with the request. In one embodiment, customizing the response to the request may include determining a response to the request in view of the determined one or more elements. For example, customizing the response to the request may include determining a response to the request that is specifically tailored to the determined one or more elements associated with the request. In another embodiment, if the one or more elements associated with the request include a specific type of device that sent the request and a specific communication channel used to send the request, then the response to the request may be specifically tailored to the specific type of device and the specific communication channel.

Further still, in one embodiment, the response may include one or more actions to be performed by the user. For example, the response may include instructions detailing one or more actions to be performed by the user in order to satisfy the request. In another embodiment, the one or more actions to be performed by the user may be specific to the determined one or more elements associated with the request. For example, instructions detailing one or more actions to be performed by the user may be specific to the type of device used to send the request, the communication channel used to send the request, or any other elements associated with the request.

Also, in one embodiment, the response may include one or more predefined actions to be selected by the user. For example, the response may include one or more links sent to the user, where such links are directly associated with the elements associated with the request, and where the user may select one or more of the links in order to perform one or more actions. In another embodiment, the response may include one or more communication addresses (e.g., phone numbers, email addresses, etc.) that are directly associated with the elements associated with the request, where the user may select one or more of the communication addressees in order to perform one or more additional actions.

Additionally, in one embodiment, the response may include one or more actions that are to be automatically performed on a device. For example, the response may include one or more actions to be automatically performed on a device from which the request was submitted, a device associated with a user who sent the request, etc. In another embodiment, the user may be asked to approve the one or more actions before the actions are automatically performed on the device. In yet another embodiment, the user may not be involved when the one or more actions are automatically performed on a device. For example, a user may not be asked to approve the one or more actions that are performed on a device before such actions are automatically performed on the device.

Further, in one embodiment, the one or more actions to be automatically performed on the device may include one or more instructions (e.g., executable code, etc.) that are executed by the device upon receipt by the device. In another embodiment, the one or more actions to be performed on the device may be specific to the determined elements associated with the request. For example, the one or more actions performed on the device may be specific to the type of device used to send the request, the communication channel used to send the request, or any other means by which the request was sent.

Further still, as shown in operation 308, the response to the request is initiated. In one embodiment, initiating the response to the request may include sending a message to the device that sent the request. In another embodiment, initiating the response to the request may include sending one or more actions to be performed by the user to the device that sent the request. In another embodiment, initiating the response to the request may include sending one or more actions to be performed by the user to a device associated with the user that is not the device from which the request was sent. For example, the user may initially send a request regarding a second device from a first device, and in response, one or more actions to be performed by the user may then be sent to the second device.

Also, in one embodiment, initiating the response to the request may include automatically performing one or more actions. For example, initiating the response to the request may include sending executable code to the device that sent the request, where such code is automatically run by the device that sent the request, such that one or more actions are performed by the device in response to the running of the code. In another example, initiating the response to the request may include sending executable code to another device associated with the user that is not the device from which the request was sent, where such code is automatically run by the other device, such that one or more actions are performed by the other device in response to the running of the code. In another embodiment, the user may be notified before the one or more actions are automatically performed. In yet another embodiment, the user may be given the option to cancel the automatic performance of the one or more actions.

In this way, the response to the request may be specifically tailored to the one or more elements associated with the request, and may therefore address the request in an accurate and specific manner.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
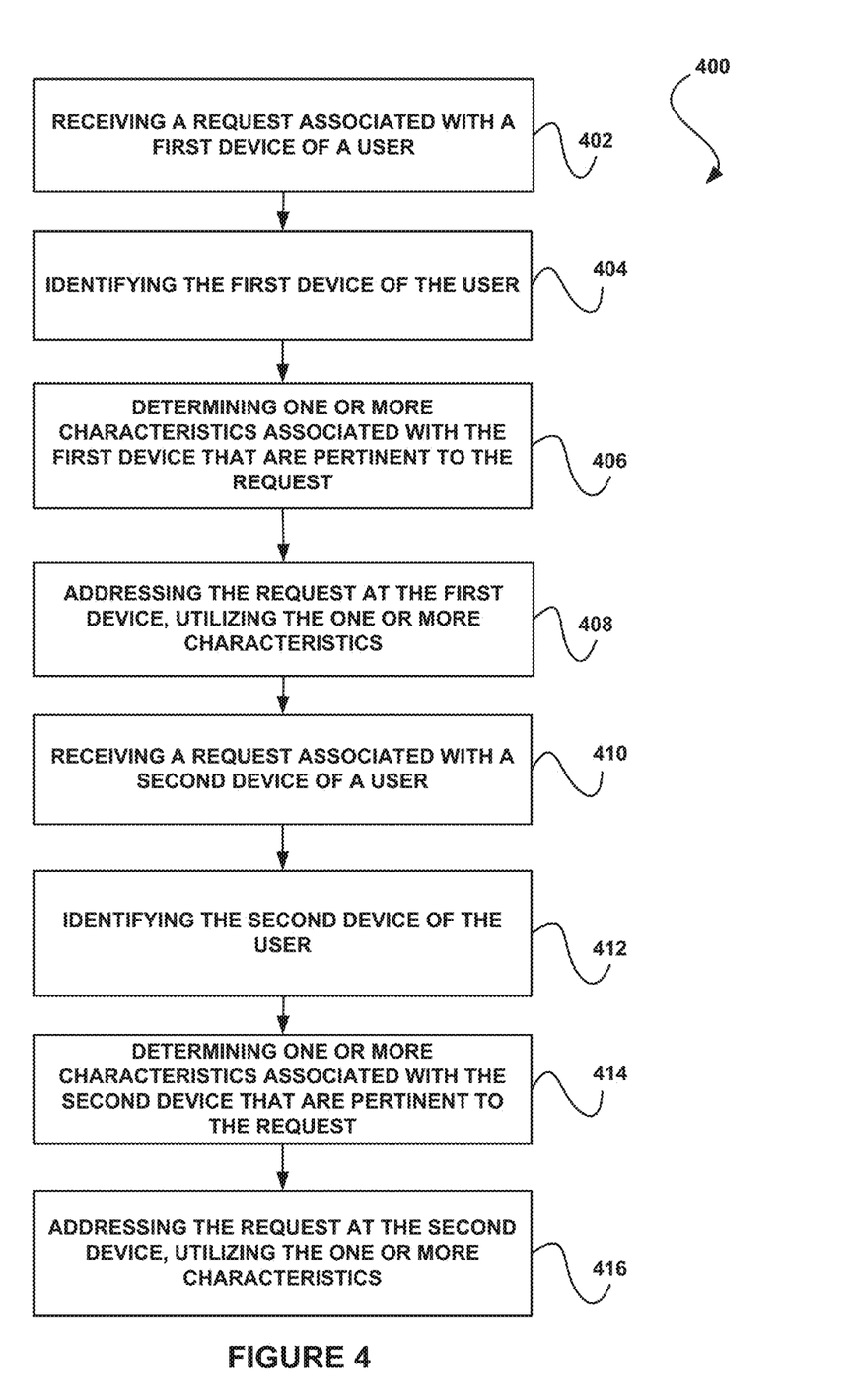
FIG. 4 illustrates a method for supporting action execution on a multi-channel system, in accordance with one embodiment.

FIG. 4 illustrates a method 400 for supporting action execution on a multi-channel system, in accordance with one embodiment. As an option, the method 400 may be carried out in the context of the details of FIGS. 1-3. Of course, however, the method 400 may be carried out in any desired environment. Further, the aforementioned definitions may equally apply to the description below.

As shown in operation 402, a request associated with a first device of a user is received. In one embodiment, the request may be in the form of a question. For example, the request may be part of a one question, one answer system. In another embodiment, the request may be associated with the first device. For example, the request may include a customer service question, such as "how do I take a picture on this device?" In another embodiment, the request may include a request to perform an action. For example, the request may include a request to perform a specific action within the first device.

Also, in one embodiment, the request may be sent from the first device utilizing an application of the first device. For example, the request may be sent from the first device utilizing a customer service application of the first device. In yet another embodiment, the request may be sent from a device other than the first device. For example, the request may include a customer service question, such as "how do I calibrate the smart television in my living room?"

Additionally, as shown in operation 404, the first device of the user is identified. In one embodiment, the first device of the user may be identified by analyzing the request. For example, the first device of the user may be identified within the request (e.g., by parsing the request, analyzing the request, etc.). In another example, the request may include information associated with the first device that may be analyzed in order to identify the device. In another embodiment, the first device of the user may be identified by accessing a database. For example, a database may store an identifier of the user linked to information regarding all devices known to be owned and operated by the user. In another example, the database may be located at a billing system, a partner system, a customer service management system, a BSS/OSS, etc. In another example, the identifier of the user may be determined (e.g., by analyzing the request, information associated with the request, etc.). In still another example, all devices known to be owned and operated by the user may be determined by searching for information linked to the determined identifier within the database.

Further, in one embodiment, if it is determined that the user is associated with a plurality of devices, the first device may be determined by comparing information associated with the request against the plurality of devices. For example, the list of devices may be compared against one or more of an internet protocol (IP) address associated with the request, a media access control (MAC) address associated with the request, a network connection through which the request was sent, etc. In another example, the device within the plurality of devices that matches the information associated with the request may be identified as the first device of the user.

Further still, as shown in operation 406, one or more characteristics associated with the first device that are pertinent to the request are determined. In one embodiment, the one or more characteristics of the first device may include one or more applications installed on the first device, one or more hardware elements installed within the first device, a communications connection utilized by the first device, a level of service subscribed to for the device, an amount of data able to be displayed by the device at a single instance, etc. In another embodiment, the one or more characteristics that are pertinent to the request may include characteristics that may be used by the first device when performing an action in accordance with the request. For example, if the request includes a question about how to take a picture with the first device, the one or more characteristics associated with the first device that are pertinent to the request may include one or more parameters associated with a camera installed within the first device.

Also, as shown in operation 408, the request is addressed at the first device, utilizing the one or more characteristics associated with the first device determined to be pertinent to the request. In one embodiment, addressing the request may include performing one or more actions in association with the first device. In another embodiment, addressing the request may include sending executable code to the first device, where the first device runs and/or interprets the executable code in order to perform one or more actions. For instance, if the request includes a question about how to take a picture with the first device, addressing the request may include sending instructions specific to the first device that instruct the first device to activate a camera of the first device, open camera software associated with the first device, etc.

In addition, as shown in operation 410, a request associated with a second device of a user is received. In one embodiment, the request may be sent from the second device of the user. In another embodiment, the request may be sent from the first device of the user. Furthermore, as shown in operation 412, the second device of the user is identified. For example, the device within a plurality of devices associated with the user that matches the information associated with the request may be identified as the second device of the user.

Further still, as shown in operation 414, one or more characteristics associated with the second device that are pertinent to the request are determined. Also, as shown in operation 416, the request is addressed at the second device, utilizing the one or more characteristics associated with the second device determined to be pertinent to the request.

In this way, responses to requests may be tailored to a specific device associated with the request, which may thereby enable more specific and relevant responses to requests. Additionally, a device pertinent to a request may be automatically detected a user, and the user may not need to specify the device in the request as a result.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising computer code for:
storing, by a system in a database:
an identifier of a user,
a link between the identifier of the user and a plurality of devices owned and operated by the user, and
information describing characteristics of each of the devices, the characteristics including:
a plurality of applications installed on the device,
the plurality of hardware elements installed on the device,
an indication of a communications connection including a network utilized by the device,
a level of service subscribed to for the device,
a plurality of parameters for the one of the plurality of hardware elements, and
an amount of data able to be displayed by the device at a single instance;
receiving, at the system from a first end-user device of the plurality of devices of the user and utilizing a customer service application, a customer support request including a request for assistance with taking a picture using a second end-user device of the plurality of devices of the user, the second end-user device being separate from the first end-user device;
in response to receiving the customer support request, determining by the system the second end-user device for which the assistance is requested by:
determining the identifier of the user from the customer support request,
using the determined identifier of the user, searching by the system the database to identify the plurality of devices linked in the database to the identifier of the user,
using information included in the request, determining by the system, which of the devices identified from the database is the second end-user device for which the assistance is requested;
from the information in the database describing the characteristics of the device that is determined to be the second end-user device, identifying, by the system, a portion of the characteristics of the second end-user device that are pertinent to the request for assistance with taking the picture using a second end-user device, the portion of the characteristics of the second end-user device that are pertinent to the request including parameters associated with a camera installed within the second end-user device;
customizing by the system a response to the request, utilizing the identified portion of the characteristics of the second end-user device that are pertinent to the request, including creating executable code to be run on the second end-user device to instruct the second end-user device to activate a camera of the second end-user device and open camera software associated with the second end-user device; and
initiating the response to the request by the system, including:
sending the executable code to the second end-user device via the communications connection including the network indicated within the identified characteristics of the second end-user device for execution of the executable code on the second end-user device.

2. A method, comprising:
storing, by a system in a database:
an identifier of a user,
a link between the identifier of the user and a plurality of devices owned and operated by the user, and
information describing characteristics of each of the devices, the characteristics including:
a plurality of applications installed on the device,
the plurality of hardware elements installed on the device,
an indication of a communications connection including a network utilized by the device,
a level of service subscribed to for the device,
a plurality of parameters for the one of the plurality of hardware elements, and
an amount of data able to be displayed by the device at a single instance;
receiving, at the system from a first end-user device of the plurality of devices of the user and utilizing a customer service application, a customer support request including a request for assistance with taking a picture using a second end-user device of the plurality of devices of the user, the second end-user device being separate from the first end-user device;
in response to receiving the customer support request, determining by the system the second end-user device for which the assistance is requested by:
determining the identifier of the user from the customer support request,
using the determined identifier of the user, searching by the system the database to identify the plurality of devices linked in the database to the identifier of the user,
using information included in the request, determining by the system, which of the devices identified from the database is the second end-user device for which the assistance is requested;
from the information in the database describing the characteristics of the device that is determined to be the second end-user device, identifying, by the system, a portion of the characteristics of the second end-user device that are pertinent to the request for assistance with taking the picture using a second end-user device, the portion of the characteristics of the second end-user device that are pertinent to the request including parameters associated with a camera installed within the second end-user device;

customizing by the system a response to the request, utilizing the identified portion of the characteristics of the second end-user device that are pertinent to the request, including creating executable code to be run on the second end-user device to instruct the second end-user device to activate a camera of the second end-user device and open camera software associated with the second end-user device; and initiating the response to the request by the system, including:
  sending the executable code to the second end-user device via the communications connection including the network indicated within the identified characteristics of the second end-user device for execution of the executable code on the second end-user device.

3. A system, comprising:
a processor coupled to memory via a bus for:
  storing, by the system in a database:
    an identifier of a user,
    a link between the identifier of the user and a plurality of devices owned and operated by the user, and
    information describing characteristics of each of the devices, the characteristics including:
      a plurality of applications installed on the device,
      the plurality of hardware elements installed on the device,
      an indication of a communications connection including a network utilized by the device,
      a level of service subscribed to for the device,
      a plurality of parameters for the one of the plurality of hardware elements, and
      an amount of data able to be displayed by the device at a single instance;
  receiving, at the system from a first end-user device of the plurality of devices of the user and utilizing a customer service application, a customer support request including a request for assistance with taking a picture using a second end-user device of the plurality of devices of the user, the second end-user device being separate from the first end-user device;

in response to receiving the customer support request, determining by the system the second end-user device for which the assistance is requested by:
    determining the identifier of the user from the customer support request,
    using the determined identifier of the user, searching by the system the database to identify the plurality of devices linked in the database to the identifier of the user,
    using information included in the request, determining by the system, which of the devices identified from the database is the second end-user device for which the assistance is requested;

from the information in the database describing the characteristics of the device that is determined to be the second end-user device, identifying, by the system, a portion of the characteristics of the second end-user device that are pertinent to the request for assistance with taking the picture using a second end-user device, the portion of the characteristics of the second end-user device that are pertinent to the request including parameters associated with a camera installed within the second end-user device;

customizing by the system a response to the request, utilizing the identified portion of the characteristics of the second end-user device that are pertinent to the request, including creating executable code to be run on the second end-user device to instruct the second end-user device to activate a camera of the second end-user device and open camera software associated with the second end-user device; and initiating the response to the request by the system, including:
    sending the executable code to the second end-user device via the communications connection including the network indicated within the identified characteristics of the second end-user device for execution of the executable code on the second end-user device.

* * * * *